United States Patent
Sinzel et al.

(10) Patent No.: US 12,459,342 B2
(45) Date of Patent: Nov. 4, 2025

(54) METHOD AND SETTING ARRANGEMENT FOR DISPENSING TOLERANCE COMPENSATION ELEMENTS

(71) Applicant: AUDI AG, Ingolstadt (DE)

(72) Inventors: Steffen Sinzel, Weinsberg (DE); Norbert Hornbostel, Talheim (DE); Alexander Löfflath, Neuenstadt (DE)

(73) Assignee: AUDI AG, Ingolstadt (DE)

( * ) Notice: Subject to any disclaimer, the term of this patent is extended or adjusted under 35 U.S.C. 154(b) by 1001 days.

(21) Appl. No.: 17/544,974

(22) Filed: Dec. 8, 2021

(65) Prior Publication Data

US 2022/0176790 A1    Jun. 9, 2022

(30) Foreign Application Priority Data

Dec. 8, 2020 (DE) .................. 102020132626.2

(51) Int. Cl.
  *B65G 47/19*   (2006.01)
  *B60K 1/04*    (2019.01)
  (Continued)

(52) U.S. Cl.
  CPC .......... *B60K 1/04* (2013.01); *B65G 47/1471* (2013.01); *B65G 47/19* (2013.01); *H01M 50/244* (2021.01);
  (Continued)

(58) Field of Classification Search
  CPC .... B60K 1/04; H01M 50/244; H01M 50/249; H01M 2220/20; H01M 50/262;
  (Continued)

(56) References Cited

U.S. PATENT DOCUMENTS 4,869,813 A * 9/1989 Bailey ................ B23Q 17/24
                                              700/223
9,786,882 B2 * 10/2017 Goesmann ........ H01M 10/0481

FOREIGN PATENT DOCUMENTS

CN    111237314 A    6/2020
DE    10055983 C1    9/2002
(Continued)

OTHER PUBLICATIONS

Office Action issued on Feb. 28, 2024, in corresponding Chinese Application No. 202111483681.8, 12 pages.
(Continued)

*Primary Examiner* — Ryan J. Walters
(74) *Attorney, Agent, or Firm* — Maier & Maier, PLLC (57) ABSTRACT

A setting arrangement for automatically attaching tolerance compensation elements to a respective component, in particular a battery housing part. The setting arrangement has a storage unit which is designed to receive the tolerance compensation elements and to position them correctly in a row in such a way that the tolerance compensation elements positioned in the row are oriented in the same way, and a movable setting unit which has a magazine in which the tolerance compensation elements correctly positioned in a row are receivable. The magazine has a first longitudinal extension in which the tolerance compensation elements received in the magazine are arranged adjacent to one another. The magazine has an opening, and the setting unit is designed to dispense the tolerance compensation elements individually through the opening.

17 Claims, 3 Drawing Sheets

(51) Int. Cl.
*B65G 47/14* (2006.01)
*H01M 50/244* (2021.01)
*H01M 50/249* (2021.01)

(52) U.S. Cl.
CPC ...... *H01M 50/249* (2021.01); *H01M 2220/20* (2013.01)

(58) Field of Classification Search
CPC .. H01M 50/204; H01M 10/425; H01M 50/50; H01M 50/569; B65G 47/1471; B65G 47/19
See application file for complete search history.

(56) References Cited

FOREIGN PATENT DOCUMENTS

| | | | | |
|---|---|---|---|---|
| DE | 102016222094 A1 | * | 5/2018 | ............... B60K 1/00 |
| DE | 102017104359 A1 | | 9/2018 | |
| DE | 102018123215 A1 | * | 3/2020 | |
| EP | 3419081 A1 | | 12/2018 | |
| EP | 3492410 A1 | | 6/2019 | |
| KR | 1020190108380 A | | 9/2019 | |
| WO | 2020239883 A1 | | 12/2020 | |

OTHER PUBLICATIONS

German Search Report issued on Oct. 8, 2021 in corresponding German Application No. 102020132626.2; (18 pp., including machine-generated English translation).

* cited by examiner

METHOD AND SETTING ARRANGEMENT FOR DISPENSING TOLERANCE COMPENSATION ELEMENTS

FIELD

The invention relates to a method and a setting arrangement for automatically attaching tolerance compensation elements to a respective component, in particular a battery housing part.

BACKGROUND

A battery, in particular a high-voltage battery for a motor vehicle, typically has a battery housing and multiple battery modules accommodated therein. The housing can, for example, have a peripheral frame, and also possibly longitudinal and transverse struts. The battery modules are furthermore attached to the housing, that is to say, for example, to the frame or to these longitudinal or transverse struts. For this purpose, corresponding screw flanges are arranged in corresponding fastening regions on the housing, in particular on the frame or the longitudinal or transverse struts, to which the module housings of the relevant battery modules are screwed. Furthermore, the battery modules are attached to a cooling base for improved heat dissipation. This is usually done by way of a thermal paste between the base of the battery modules and the cooling base. Due to manufacturing tolerances, unevenness in the cooling floor, and gap widths of different thicknesses between the module base and the cooling base, the battery modules therefore generally have a different height in relation to this cooling base in their end position. In order to compensate for this height tolerance when screwing the battery modules on the housing, tolerance compensation elements are provided, which can be pushed onto the screw flanges described and which, when a screw is screwed into them, compensate for the height tolerance to fasten the battery modules to the flange by means of a spring element and an inner part that can be unscrewed. In the case of large batteries having many battery modules, as is usually the case with high-voltage batteries, a correspondingly large number of such tolerance compensation elements has to be positioned on the flanges provided for this purpose.

Tolerance compensation elements are also used in numerous other regions of a motor vehicle. For example, there are diverse plugged or clipped tolerance compensation elements in the area of headlight adjustment, cockpit adjustment, and roof rails. As a rule, however, these are always installed or set manually by a worker.

Furthermore, KR 20190108380 A describes a battery assembly method according to which a cell pack having multiple battery cells can be automatically inserted into a housing part via a gripper arm. However, it is not possible to automatically set tolerance compensation elements using it.

Furthermore, DE 10 2017 104 359 A1 describes a battery housing for an electric vehicle, which has multiple transverse and longitudinal struts. A tolerance compensation element, which can be placed on such a node, is involved in the formation of the node between a respective transverse strut and a longitudinal strut. For this purpose, an assembly support is provided on which the tolerance compensation elements are arranged at their intended distance from one another. The assembly support is then brought to a specific position in relation to the frame and lowered. If the tolerance compensation elements are then positioned in their intended position, they are welded to the longitudinal struts and cross struts and then released from the assembly support. How exactly these tolerance compensation elements are fastened on the assembly support and how they are released is not disclosed. It is to be assumed that this procedure also requires numerous manual steps.

SUMMARY

The object of the present invention is therefore to provide a method and a setting arrangement that make it possible to extensively automate the process from providing the tolerance compensation elements to attaching them to the respective component, for example a battery housing part.

A setting arrangement according to the invention for automatically attaching tolerance compensation elements to a respective component has a storage unit which is designed to receive the tolerance compensation elements and to position them correctly in a row in such a way that the tolerance compensation elements positioned in the row are oriented in the same way. Furthermore, the setting arrangement has a movable setting unit which has a magazine in which the tolerance compensation elements correctly positioned in a row are receivable, wherein the magazine has a first longitudinal extension in which the tolerance compensation elements received in the magazine are arranged adjacent to one another, wherein the magazine also has an opening, and wherein the setting unit is designed to dispense the tolerance compensation elements individually through the opening.

The setting arrangement according to the invention has the great advantage that all method steps from providing the tolerance compensation elements in the storage unit to attaching them to the respective components, for example battery housing parts, can be carried out automatically and without interaction by a user or operator. In particular, dispensing a tolerance compensation element from the opening can be accompanied at the same time by attaching this tolerance compensation element to the corresponding component, in particular the battery housing part. For example, the tolerance compensation element can be automatically pushed onto the flange described at the outset or onto a flange of another component when it is dispensed from the opening. It is also particularly advantageous that the tolerance compensation elements can be dispensed at an angle in relation to the first longitudinal extension of the magazine, in particular at a right angle in relation thereto. This in turn makes it possible for the magazine itself to be made very elongated, and yet it is possible for the tolerance compensation elements to be pushed onto a flange in a push-on direction in which not much installation space is available. Nevertheless, it is also conceivable that the setting unit is designed in such a way that the tolerance compensation elements are dispensed in the direction of the first longitudinal extension. This is particularly advantageous when the tolerance compensation elements are to be placed or plugged onto a component. Due to the movable design of the setting unit, it can advantageously be moved from setting position to setting position and/or moved from a filling position to at least one setting position. Furthermore, the magazine is advantageously designed to accommodate multiple tolerance compensation elements at the same time. The movable setting unit can, for example, bring the magazine into a filling position in which it is filled, and then it is brought into one or more setting positions in which the tolerance compensation elements are set. In this way, the setting process is extremely time-saving. In addition, the correct positioning of the tolerance compensation elements does not have to be carried out manually, but can also be carried out automatically by the storage unit. Complex manual sorting and orientation processes can thus advantageously be dispensed with. The setting unit can also be filled automatically. Numerous tolerance compensation elements can thus be set automatically in a very short time.

The setting arrangement described in the context of the invention is particularly well suited for pushing tolerance compensation elements, for example as will be described in more detail hereinafter, onto a housing part, for example a flange, of a battery housing for a battery, in particular a high-voltage battery, of a motor vehicle. Nevertheless, the setting arrangement is generally also usable to set tolerance compensation elements or also even elements that are not used for tolerance compensation on a component in general. Such a component does not necessarily have to be part of a battery housing, but can in principle represent any other component, preferably a motor vehicle component. As described above, tolerance compensation elements, for example plugged or clipped tolerance compensation elements, are also used in the area of headlight adjustment, cockpit adjustment, and roof rails. Accordingly, the component can be, for example, a headlight component or a cockpit component or a roof rail component. Applications outside of the automotive sector are also conceivable. The setting arrangement is particularly advantageously suitable above all for elements such as tolerance compensation elements that are to be pushed onto another component, for example a flange. This is because the dispensing of the elements from the magazine can also be accompanied at the same time by such pushing on. It is also conceivable, for example, that such elements have a hole or an opening or bore and are dispensed having such a bore in front and at the same time are pushed onto a pin-shaped component. Such an element dispensable from the magazine can also have a pin and can be dispensed from the magazine with this in front and at the same time can be pushed into an opening or bore in the component. Numerous further designs of the elements and the corresponding components to which the elements are attachable by means of the setting arrangement are also possible. Instead of a tolerance compensation element having a gap, an element having a hole or an opening or recess of any geometry, a pin, a clip, or a protruding component of any geometry or the like can be dispensed from the magazine. Instead of a component designed as a flange, a component having a pin or hole or any other depression or elevation can therefore also be provided in order to arrange the element thereon by means of the setting arrangement. Although the invention and its exemplary embodiments are illustrated and explained below primarily on the basis of the example of tolerance compensation elements to be attached or set on a battery housing part, the invention and its exemplary embodiments are not interpreted to be restricted to this preferred application.

The tolerance compensation elements, which are preferably to be set with a setting arrangement according to the invention or one of its embodiments, are preferably designed as follows: Such a tolerance compensation element has a through opening along a central axis of rotation for passing through or screwing in a screw. Furthermore, such a tolerance compensation element has a gap which extends perpendicular to the axis of rotation and which separates an upper part of the tolerance compensation element from a lower part of the tolerance compensation element. The upper and lower parts of the tolerance compensation element are connected to one another by a web extending in parallel to the axis of rotation. At least the upper part of the tolerance compensation element is made in multiple parts and has an interior part, also called the inner part, which is unscrewable from an exterior part, also called the outer part, of the upper part, in particular in the direction of the axis of rotation. By unscrewing this inner part, a height of the tolerance compensation element changes in the direction of its axis of rotation. If a screw is screwed into them to fasten the battery modules on the flange, the tolerance compensation elements thus compensate for the height tolerance by means of a spring element and the unscrewable inner part. Such a tolerance compensation element is pushed by means of the setting arrangement onto a component designed as a flange, in particular a battery housing part, of a battery housing of a high-voltage battery. This is done by pushing the tolerance compensation element onto such a flange in such a way that the flange engages in the described gap until an edge of the flange comes to rest on the web of the tolerance compensation element. In this case, the tolerance compensation element snaps onto a press-in nut that was previously pressed into the flange. In the intended end position, the upper part of the tolerance compensation element is accordingly arranged on one side of the flange and the lower part of the tolerance compensation element is arranged on an opposing other side of the flange. In this end position, the through opening of the tolerance compensation element is arranged coaxially with a through opening in the flange.

The tolerance compensation elements can, however, also be designed in such a way that they can be placed or plugged onto a component. For this purpose, the respective tolerance compensation elements can comprise, for example, plug connections on the lower side.

The correct sorting and positioning in the storage unit takes place in such a way that, if multiple tolerance compensation elements are ultimately arranged in the same orientation in the row, the axes of rotation of the respective tolerance compensation elements are arranged collinear to one another, the respective upper parts of the tolerance compensation elements point in the same direction, and also the respective gaps are oriented perpendicular in relation to the respective axis of rotation in the same direction. This can advantageously ensure that these tolerance compensation elements are ultimately positioned the right way around on the flange and that the gap is also correctly oriented with respect to the flange. If elements other than the tolerance compensation elements described are used, they can be sorted, oriented, and positioned similarly, so that they are all arranged in the row having the same orientation in accordance with their geometry.

The setting unit can, for example, have a robot arm which is designed to move the magazine. The setting unit thus does not necessarily have to be moved as a whole, but only part of the setting unit, in particular the magazine, can also be moved.

In a further advantageous embodiment of the invention, the setting arrangement, in particular as a feed technology, has a provision unit which is designed to receive the tolerance compensation elements correctly positioned in a row by the storage unit and to transfer them to the setting unit. This configuration advantageously enables the cycle times to be shortened enormously. This is because that the setting unit can set the tolerance compensation elements by way of an additional provision unit, while the provision unit is filled using the tolerance compensation elements provided by the storage unit. This filling process can take longer under certain circumstances. This time span can now advantageously be used by the setting unit to set the tolerance compensation elements that are already in the magazine. In other words, waiting times for the setting unit are avoided by an additional provision unit. The transfer of the tolerance compensation elements from the provision unit to the setting unit, in contrast, can take place extremely quickly. For example, the magazine can simply dock on the provision unit and a cylinder simply pushes the tolerance compensation elements, which are positioned in the correct location in the row, from the provision unit into the magazine. This transfer option only represents one example. Other transfer options are also conceivable, for example an electric motor transfer or the like.

Therefore, it represents a further advantageous embodiment of the invention if the provision unit has a receiving device having a receiving region which has a second longitudinal extension, wherein the receiving device is designed such that the tolerance compensation elements correctly positioned in the row along the second longitudinal extension of the receiving region are receivable in succession in the receiving region, wherein the receiving device has an inlet opening at one end with respect to the second longitudinal extension and an outlet opening at an opposite end with respect to the second longitudinal extension. In this case, at least a certain part of the tolerance compensation elements received in the receiving region can be pushed out of the outlet opening, in particular by a sliding device, for example a cylinder, insertable into the inlet opening. The receiving region thus has a second longitudinal extension, which preferably represents the largest dimension of the receiving region. In other words, the receiving region can have a length in this longitudinal extension direction that is greater than a height and/or width or a diameter of the receiving region. The receiving device can, for example, be made tubular or hollow-cylindrical, but preferably having a non-circular cross-section. For example, the receiving region can be delimited by an inner wall which has a geometry corresponding in cross section to the contour of the tolerance compensation element. Moreover, the receiving device having the receiving region can be designed in the form of an elongated hollow profile. The fact that the receiving device, in particular the wall delimiting the receiving region, is not circular in a cross section perpendicular to the longitudinal extension direction, has the advantage that a rotation lock of the tolerance compensation elements can be provided in this way. This ensures that they maintain their correct orientation. As a result of this design of the provision unit, the tolerance compensation elements can simply be pushed into the inlet opening of the receiving device of the provision unit and the provision unit can thus be filled. The setting device can also dock on the outlet opening of the receiving device, in particular with the magazine of the setting unit, and then the tolerance compensation elements received in the receiving region of the provision unit can be pushed through the outlet opening into the magazine. The tolerance compensation elements can be pushed into the setting unit, in particular into its magazine, for example by means of a cylinder. The magazine and the receiving region of the provision unit are aligned collinear with their first and second longitudinal extensions during this transfer. In particular, these longitudinal extensions extend collinearly, coaxially to the axes of rotation of the respective tolerance compensation elements, which are coaxially aligned with one another. In this way, an automatic and simple transfer and filling of the magazine of the setting unit may be provided. In particular, the correct position of the tolerance compensation elements is retained. The magazine of the setting unit can also be formed having a rotation lock, as will be explained in more detail later.

Furthermore, it is particularly advantageous if, as provided according to a further embodiment of the invention, the storage unit for orienting the tolerance compensation elements has a vibrating bowl and/or a step conveyor and in particular comprises a provision channel in which the oriented tolerance compensation elements can be correctly positioned in a row. Orientation devices such as the mentioned vibrating bowl and/or the step conveyor are known from the prior art and advantageously allow sorting and orientation of the tolerance compensation elements, in particular automatic correct positioning. If the storage unit comprises a vibrating bowl, it is also preferred that a rotational direction of this vibrating bowl is opposite to a rotational direction of the tolerance compensation elements to be sorted and transported with regard to their inner parts described above. The tolerance compensation elements preferably have inner parts which can be unscrewed relative to corresponding outer parts of the upper parts of the tolerance compensation elements to effectuate the tolerance compensation. In order to unscrew these inner parts, they are turned in a certain rotational direction in relation to the outer parts. This should therefore be opposite to the rotational direction of the vibrating bowl so that these inner parts of the tolerance compensation elements are not inadvertently unscrewed. This is because these should preferably be positioned in an initial state on the corresponding flanges of the battery housing in which they are not unscrewed and are correspondingly minimal in their height with respect to their defined axis of rotation. This can advantageously be achieved by matching the rotational direction of the vibrating bowl with the rotational direction of these inner parts.

Nonetheless, it is still advantageous to provide additional height monitoring in order to ensure that the tolerance compensation elements are also attached without being unscrewed. It therefore represents a further particularly advantageous embodiment of the invention if the storage unit has a height monitoring device which is designed to check whether the tolerance compensation elements positioned correctly in the row each have a certain initial state in which the tolerance compensation elements, which are changeable in their height with respect to a defined axis of rotation of the tolerance compensation elements, have a minimum height with respect to the defined axis of rotation. By means of such a height monitoring device, it can also be checked once again that the tolerance compensation elements are also in the non-unscrewed state and thus in the initial state. For this purpose, the height monitoring device can have any height monitoring means known from the prior art. For example, such height monitoring can take place optically, for example in the form of a light barrier designed for height measurement or by means of a camera and image analysis method or also mechanically by means of a feeler or the like. It is also particularly advantageous to provide such height monitoring by the height monitoring device at a position at which the tolerance compensation elements are provided for transfer to the provision unit and/or the setting unit. This is particularly advantageous because at this point in time the sorting and orientation has already been completed and the tolerance compensation elements cannot be unintentionally unscrewed, since they are no longer subjected to movements that could cause such unintentional unscrewing of the relevant inner parts. At the same time, height monitoring is provided before it is transferred to a further component, namely the provision unit or the setting unit, so that in the case that an unscrewed tolerance compensation element is detected, such an element can still be corrected or sorted out in a timely manner. If such an element were already in the provision unit or the setting unit, the sorting out would be made significantly more difficult and the setting process would be interrupted. Accordingly, it is also advantageous to provide the tolerance compensation elements along a provision channel of the storage unit, which can be provided in the form of a rail or the like, for example, and which does not surround the tolerance compensation elements on all sides perpendicular to their axes of rotation. This makes it possible to reach the tolerance compensation elements easily, for example to sort out unscrewed compensation elements.

In a further advantageous embodiment of the invention, the magazine has a receiving region which is delimited perpendicular to the longitudinal extension by a wall of the magazine, wherein one of the walls has a geometry different from a circular shape in a cross section perpendicular to the first longitudinal extension, in particular so that tolerance compensation elements received in the magazine are essentially not rotatable around an axis of rotation which extends in the second longitudinal extension and is assigned to the tolerance compensation elements. In other words, the geometry of the wall of the magazine can also provide a rotation lock, which prevents the tolerance compensation elements located in the receiving region from being able to rotate about their axis of rotation. This guarantees that the correct orientation of the tolerance compensation elements is maintained. The fact that the tolerance compensation elements are preferably essentially not rotatable around their axis of rotation is to be understood to mean that they are at least rotatable by less than a predetermined amount around their axis of rotation. Due to the tolerance, a certain amount of play with regard to a rotation around the axis of rotation is nevertheless permissible.

As described, the tolerance compensation elements preferably have a defined axis of rotation and a cross-sectional geometry perpendicular to the axis of rotation, which is different from a circular shape. A maximum diameter perpendicular to the axis of rotation of such a tolerance compensation element can be greater than a minimum diameter of the cross section of the receiving region perpendicular to its longitudinal extension. It is then ensured that such a tolerance compensation element cannot rotate around its axis. In this way, the correctly positioned tolerance compensation elements can be transported from the storage unit to the setting without running the risk of something changing in this correct orientation.

According to a further advantageous embodiment of the invention, the magazine has a closure element, by means of which the opening of the magazine is at least partially closable, wherein the setting unit is designed such that the magazine can be moved between a filling position and at least one setting position, wherein the setting unit is designed such that the opening is closable by means of the closure element at least during the movement of the magazine between the filling position and the at least one setting position and in particular also during filling. This closure element thus functions as a loss prevention device, which provides protection against movement or falling out. The opening can only be released by opening this closure element, for example, if a current tolerance compensation element is to be pushed out of the opening for setting.

According to a further advantageous embodiment of the invention, the setting unit has a second sliding device having a movable element, by means of which a tolerance compensation element positioned in the sliding direction in front of the opening can be pushed out of the opening, in particular perpendicular to the first longitudinal extension direction. The tolerance compensation element or all tolerance compensation elements located in the magazine are to be oriented such that their gaps, or in general their connecting mechanism or connecting geometry, such as an opening, a pin, or the like, point in the direction of the opening when they are positioned in front of the opening. Only one such tolerance compensation element at a time is always positioned in front of the opening, so that always only one tolerance compensation element can currently be pushed out of the opening. If this is pushed out having its gap or in general its connecting mechanism in front, it is thus made possible to push the tolerance compensation element onto the described flange of the battery housing or in general onto a component. If such a tolerance compensation element has been pushed out of the opening, the next tolerance compensation element in the row can slide down and position itself in front of the opening, preferably automatically under the influence of gravity.

Therefore, it represents a further advantageous embodiment of the invention if the opening is located in an end region of the receiving region of the magazine with respect to the longitudinal extension, so that only one last tolerance compensation element in the row in which the tolerance compensation elements are arranged can be pushed out of the opening, wherein the setting unit is designed in such a way that the magazine is aligned when the last tolerance compensation element is pushed out of the opening such that the last tolerance compensation element represents a lowest tolerance compensation element with respect to gravity. For example, the magazine can be aligned having its longitudinal extension parallel to the direction of gravity. As soon as a tolerance compensation element, in particular the lowest tolerance compensation element, leaves the magazine through the opening, the next tolerance compensation element slides from above in front of the opening. The opening can then initially be closed again by the closure element until the setting unit has moved the magazine, for example to the next setting position.

Force-displacement monitoring or similar monitoring can also be used as process monitoring. This checks whether a set tolerance compensation element was also set in the correct position. This makes it possible to assess the setting process with repeatable accuracy.

Furthermore, it is preferred that the provision unit can receive at least as many tolerance compensation elements as the magazine of the setting unit. As a result, the magazine of the setting unit can be filled to the maximum by a docking process on the provision unit. However, the magazine does not have to be completely emptied before it docks again on the provision unit. The magazine also does not necessarily have to be completely filled via the provision unit, for example not every time. In principle, it is also possible to only partially fill the magazine or, if there are still tolerance compensation elements in the magazine, to fill it up. It is particularly advantageous above all if the setting unit has a sensor system which is designed to detect when the fill level of the magazine falls below a certain fill level, for example when a certain number of tolerance compensation elements in the magazine is not reached. In addition, the sensor system can also be designed to detect when there is only a single tolerance compensation element in the magazine and/or there is no longer any tolerance compensation element in the magazine. In addition, the setting unit can be designed such that it is automatically moved back into the filling position, i.e., docks on the provision unit, for example, when the sensor system detects that fewer than a predetermined number of tolerance compensation elements or no tolerance compensation elements are left in the magazine. The sensor system can, for example, comprise at least two initiators that are attached to the magazine in the setting head. These can be provided, for example, as light signals or light barriers. In this way, different loading cycles can be implemented in the series, i.e., the setting device or the setting unit can move to loading, i.e., refilling the magazine, if the magazine falls below a predetermined critical number of tolerance compensation elements.

Furthermore, it is preferred that the storage unit is arranged and filled outside a manufacturing cell. The provision unit and the setting unit, for example a setting device, are preferably located within the manufacturing cell. The manufacturing cell can be separated from the surroundings, that is to say the area outside the manufacturing cell, by a protective fence. For example, if the storage unit is filled manually, it is thus ensured that people cannot get into the manufacturing cell. The storage unit and the provision unit can couple via a coupling region, which can be implemented by a passage in the protective fence.

Furthermore, the invention also relates to a method for automatically setting a tolerance compensation element on a component, in particular a battery housing part, wherein multiple tolerance compensation elements are received in a storage unit, which are positioned correctly in a row by means of the storage unit such that the tolerance compensation elements positioned in the row are oriented the same way. Furthermore, the tolerance compensation elements positioned correctly in a row are received in a magazine of a movable setting unit, so that the tolerance compensation elements received in the magazine are arranged adjacent to one another in a longitudinal extension direction of the magazine, wherein the magazine has an opening, and wherein the setting unit dispenses one of the tolerance compensation elements individually through the opening, for example at an angle in relation to a first longitudinal extension direction or in the direction of the longitudinal extension, and thus sets it.

The advantages described for the setting arrangement according to the invention and its embodiments apply in the same way to the method according to the invention. In addition, the objective features described in conjunction with the setting arrangement according to the invention and its embodiments enable the method according to the invention to be refined by further corresponding method steps.

It is furthermore particularly advantageous if the tolerance compensation elements are designed such that when a first part of the tolerance compensation element is rotated relative to a second part of the tolerance compensation element in a first rotational direction with respect to an axis of rotation of the tolerance compensation element, a height of the tolerance compensation element increases in the direction of the axis of rotation, wherein the storage unit for orienting the tolerance compensation elements has a vibrating bowl that performs a vibrating movement for sorting and orienting the tolerance compensation elements, to which a second rotational direction is assigned, which is opposite to the first rotational direction. As a result, undesired unscrewing of the tolerance compensation elements when sorting and orienting them can advantageously be prevented.

The invention also comprises combinations of the features of the described embodiments. The invention therefore also comprises implementations which each have a combination of the features of several of the described embodiments, unless the embodiments have been described as mutually exclusive.

BRIEF DESCRIPTION OF THE FIGURES

Exemplary embodiments of the invention are described hereinafter. In the figures.

DETAILED DESCRIPTION

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to include combinations of the features of the embodiments other than those shown. Furthermore, the described embodiments can also be supplemented by further ones of the above-described features of the invention.

In the figures, the same reference signs designate elements that have the same function.

Figure 1:
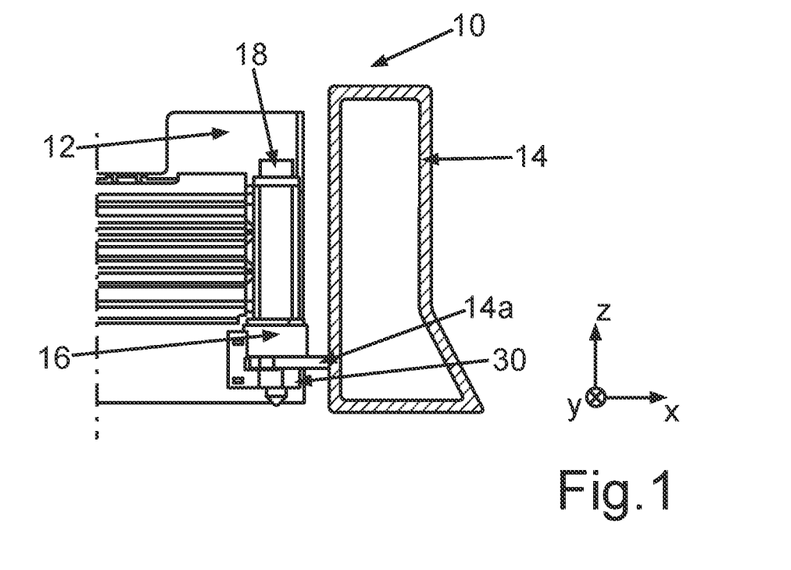
FIG. 1 shows a schematic cross-sectional illustration of a component assembly of a battery module and a battery housing having a tolerance compensation element, as was set using a setting arrangement according to an exemplary embodiment of the invention.

FIG. 1 shows a schematic cross-sectional illustration of a component assembly 10 having a battery module 12 and a battery housing 14, and having a tolerance compensation element 16, which is set in the examples described below by means of a setting arrangement according to an exemplary embodiment of the invention. Although the invention and its exemplary embodiments are illustrated and explained below primarily on the basis of the example of tolerance compensation elements 16 to be attached or set on a battery housing part 14a, the invention and its exemplary embodiments are not interpreted to be restricted to this preferred application.

Figure 2:
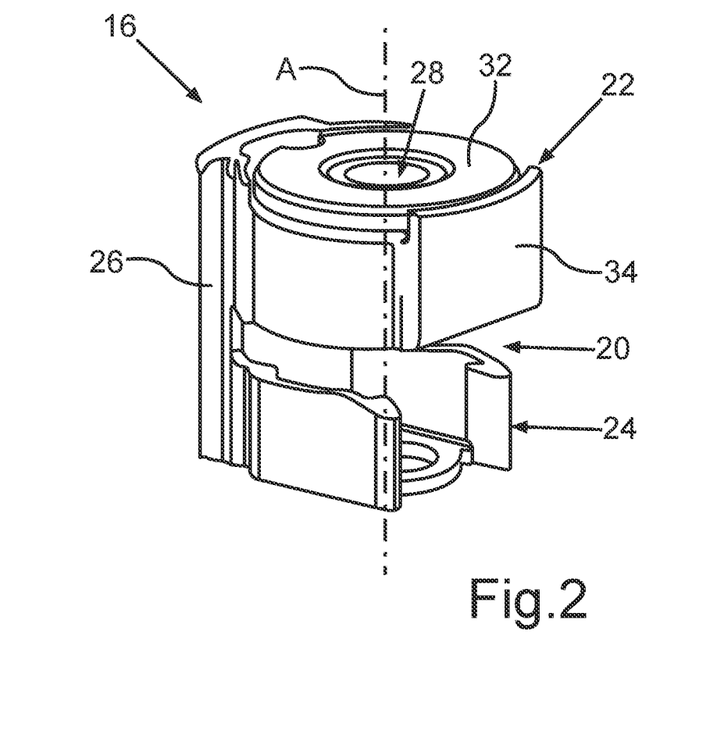
FIG. 2 shows a schematic and perspective illustration of a tolerance compensation element, as is to be set using a setting arrangement according to an exemplary embodiment of the invention.

In this example, the battery housing 14 comprises a fastening flange 14a, to which the battery module 12 is to be screwed tight by means of a battery module screw 18. Since battery modules 12 are preferably to be in direct contact with a cooling base, due to tolerances, the battery modules 12 of a battery are usually at different heights with respect to the housing 14. In order to compensate for these height differences, tolerance compensation elements 16 are used. Such a tolerance compensation element 16 is shown, for example, in a perspective illustration in FIG. 2. Since this tolerance compensation element 16 combines several components or individual components with one another, this tolerance compensation element 16 can also be referred to as a tolerance compensation system. The tolerance compensation element 16 has a gap 20 which separates an upper part 22 and a lower part 24 of the tolerance compensation element 16 from one another. The upper part 22 and the lower part 24 are connected to one another by a web 26. This extends in parallel to or in a direction of an axis of rotation A of the tolerance compensation element 16. Furthermore, the tolerance compensation element 16 has a through opening 28 along this axis of rotation A, through which a screw 18 can be passed or screwed. A press-in nut 30 (cf. FIG. 1) can be received in the lower part 24. In another variant, the tolerance compensation element 16 can be designed having a plug connection on the lower side in order to assemble the parts, i.e., tolerance compensation element 16 and component, centrally from above and not laterally, as in the examples described below. Furthermore, in this illustrated example, the upper part 22 of the tolerance compensation element 16 is made in several parts and has in particular an inner part 32 and an external part, i.e., an outer part 34. The inner part 32 is screwed into the outer part 34 or can be unscrewed therefrom. By unscrewing this inner part 32, the height of the tolerance compensation element 16 increases in the direction of its axis of rotation A. This height variation produces the tolerance compensation. This inner part 32 is unscrewed by screwing the screw 18 through the through opening 28 and into the press-in nut 30. The precise mode of operation of such a tolerance compensation element 16 is, however, less relevant for the present invention. The tolerance compensation element 16 is now to be pushed onto the flange 14a of the housing 14, as is illustrated in FIG. 1 in the intended end position of the tolerance compensation element 16 on the flange 14a. The flange 14a is therefore to engage in the gap 20 until the flange finally abuts the web 26. When the tolerance compensation element 16 is arranged on the flange 14a, the battery module 12 is not yet in the battery housing 14. This is only then inserted and screwed tight.

Since a high-voltage battery has numerous such battery modules 12 and these in turn are to be fastened on at least two fastening points on the battery housing 14 as described, numerous such tolerance compensation elements 16 have to be applied to corresponding flanges 14a of the battery housing 14. Due to the desired short cycle time, the high-voltage safety, and the ergonomics, that is to say an avoidance of a continuous setting load by the worker, an automated installation of such tolerance compensation elements 16 is particularly desirable. This is enabled by the invention or its embodiments, as will now be described in more detail below.

Figure 3:
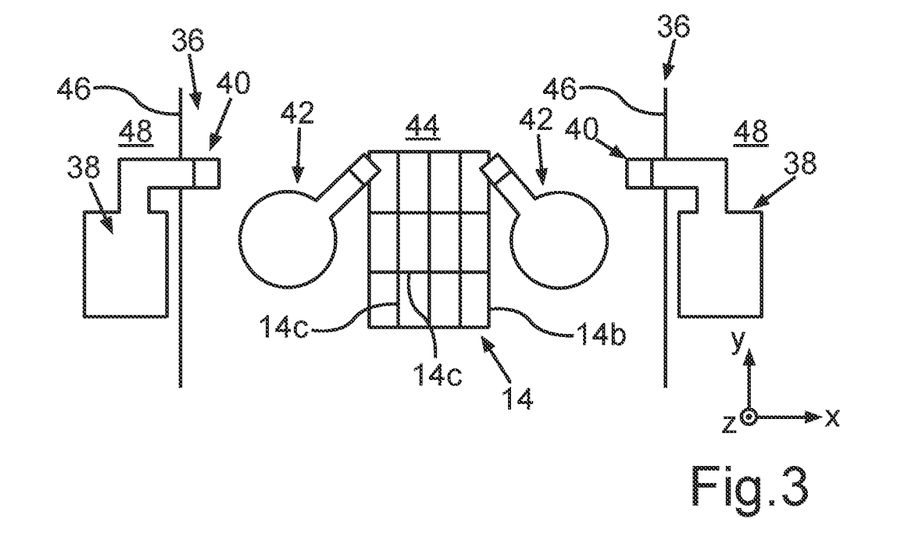
FIG. 3 shows a schematic illustration of a setting arrangement for setting tolerance compensation elements in a top view according to an exemplary embodiment of the invention.
Figure 4:
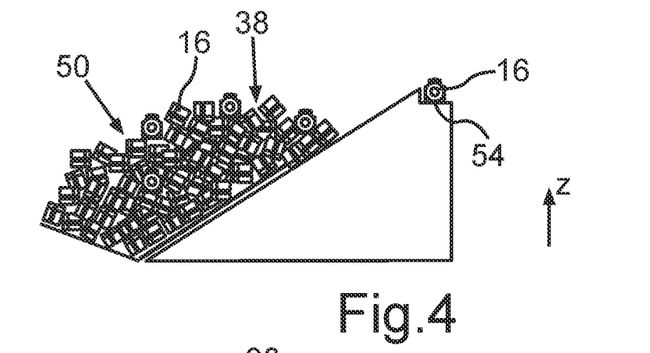
FIG. 4 shows a schematic front view of a storage unit of a setting arrangement according to an exemplary embodiment of the invention.
Figure 5:
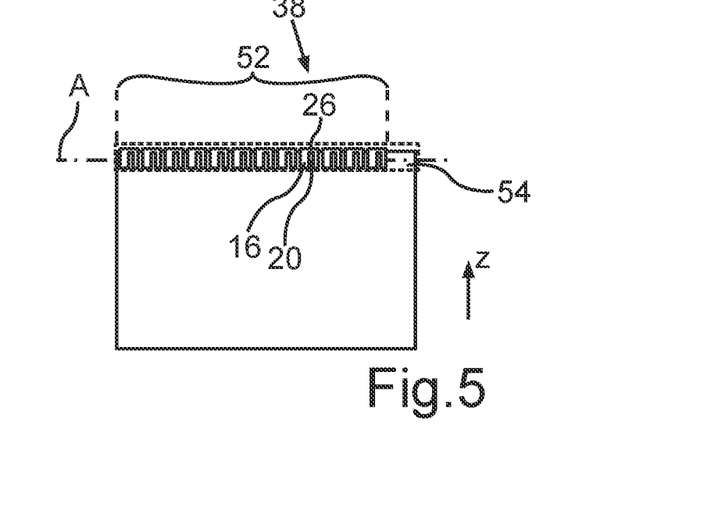
FIG. 5 shows a schematic side view of the storage unit from FIG. 4, in particular the pre-separation of the tolerance compensation elements.

This is achieved by a setting arrangement 36, which can also be referred to as a joining system and which is shown schematically in a top view in FIG. 3. For the automation of the attachment of the tolerance compensation elements 16, it is advantageous if the joining system, that is to say the setting arrangement 36, comprises three components. A first component is a storage unit 38, a second component is a provision unit 40, and a third component is a setting unit 24 in the form of a robot-guided setting device 42. FIG. 3 also shows in particular how these components 38, 40, 42 can be integrated into the production line. The storage unit 38 is preferably positioned outside the manufacturing cell 44, which can be spatially separated from an outer region 48 by means of protective fences 46. At least a part of the storage unit 38 can protrude into the manufacturing cell 44 in order to couple with the provision unit 40, which is located within the manufacturing cell, as well as the setting device 42. Furthermore, a battery box 14, that is to say the battery housing 14 described in FIG. 1, is shown in a top view in FIG. 3. This battery housing 14 can have a peripheral frame 14b, and also optionally one or more separating webs 14c, which can be designed as longitudinal or transverse struts. The flanges 14a described with reference to FIG. 1 can be arranged on the frame 14b or on these separating webs 14c. In this example, two setting arrangements 36 are shown, one to the left of the battery housing 14 and one to the right of the battery housing 14. In principle, any number, i.e., even more than two, setting arrangements 36 can be used for the assembly, depending on the cycle time to be achieved. The individual components 38, 40, 42 of the setting arrangement 36 will now be described in more detail below. FIG. 4 and FIG. 5 show a schematic illustration of the storage unit 38, wherein FIG. 4 shows it in a front view and FIG. 5 shows it in a side view. The storage unit 38 has a filling unit 50 which can be filled with the tolerance compensation elements 16, initially in a random manner. This can be implemented, for example, as a vibrating bowl or as a step conveyor. In the case of a vibrating bowl, it is important that the rotational direction is opposite to the rotational direction of the tolerance compensation elements 16 to be transported, as otherwise the tolerance compensation elements 16 may be inadvertently unscrewed, i.e., the inner parts 32 can be unscrewed relative to the outer parts 34. However, in order to simplify the subsequent screwing, the tolerance compensation elements 16 are to be installed, that is to say arranged on the flange 14a, not unscrewed. The storage unit 38 is filled from outside the manufacturing cell 44. By means of the vibrating bowl and/or the step conveyor mentioned, the storage unit 38 is designed to orient the tolerance compensation elements 16 and to position them correctly in a row 52 (see FIG. 5). As a result, they can be provided correctly positioned along a channel 54 of the storage unit 38. Correctly positioned means in this case that the axes of rotation A of the respective tolerance compensation elements 16 are arranged coaxially to one another, all of the upper parts 22 point in the same direction, and that all gaps 20 are also oriented in the same direction with respect to the axis of rotation A. In FIG. 3 and FIG. 4, in each case only one tolerance compensation element 16 and one gap 20 are provided with a reference number, which is for the sake of clarity. In this example, all webs 26, of which only one is also provided with a reference number in FIG. 5, point upwards, that is to say in the illustrated z direction. The exact direction is irrelevant here, only that the tolerance compensation elements 16 are all oriented in the same way.

Figure 6:
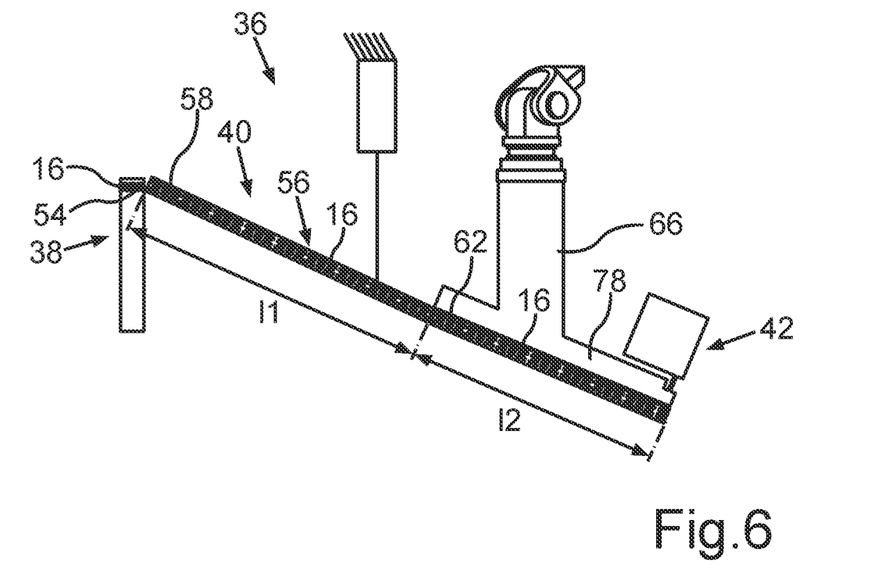
FIG. 6 shows a schematic illustration of a setting arrangement according to an exemplary embodiment of the invention, in particular during the loading of the setting device, which is in the filling position docked on the provision unit.
Figure 8:
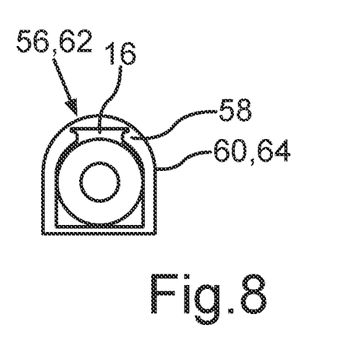
FIG. 8 shows a schematic cross-sectional illustration of the wall of a magazine of a setting unit having a tolerance compensation element arranged therein according to an exemplary embodiment of the invention.

The tolerance compensation elements 16, which are now correctly positioned, can now be transferred to the provision unit 40, as is schematically shown in FIG. 6. FIG. 6 again shows the setting arrangement 36 having the storage unit 38, the provision unit 40, and the setting device 42 in a perspective illustration. The setting device 42 is in a loading state docked on the provision unit 40. The provision unit 40 is to be filled with correctly positioned and not unscrewed tolerance compensation elements 16. The correct choice of rotational direction of the vibrating bowl ensures that these are not unscrewed. In addition, however, height monitoring, which is not explicitly shown here, can also be provided. This height monitoring preferably checks the tolerance compensation elements 16, which are correctly oriented in the channel 54, before they are fed to the provision unit 40. Unscrewed tolerance compensation elements 16 can then be sorted out even more easily. The provision unit can have a receiving device 56 which has a longitudinal extension 11, wherein the receiving device 56 furthermore comprises a receiving region 58. In this receiving region 58, which also extends in the direction of the longitudinal extension 11, the tolerance compensation elements 16 can be inserted, for example, or the provision unit 40 can be filled in another way with the tolerance compensation elements 16 provided by the storage unit 38 on the channel 54. The receiving region 58 is filled in such a way that the tolerance compensation elements 16 continue to be positioned correctly in a row within the receiving region 58. That means that here, too, they are all oriented in the same direction. FIG. 8 schematically shows a cross section through the receiving device 56 having a tolerance compensation element 16 received therein. Using the geometry of a wall 60 which delimits the receiving region 58 perpendicular to the longitudinal extent 11 and which deviates from a circular geometry, it can be ensured that the compensation elements are 16 cannot rotate within the receiving region 58, in particular around their axis of rotation A. The magazine 62 of the setting device 42, which will be described below, can also be formed having a wall 64 that has a corresponding geometry, as is also illustrated in FIG. 8. Furthermore, the provision unit, as illustrated in FIG. 6, is designed in such a way that the setting device 42 can dock on the provision unit 40, in particular on the receiving device 56, in order to push the parts 16 into the setting device 42 via a cylinder or the like, not shown here, in particular into a magazine 62 of the setting device 42. In the present example, the receiving device 56 of the provision unit 40 is inclined obliquely from top to bottom from the storage unit in the direction of the docked setting device 42. Alternatively, however, the receiving device 56 can also extend horizontally or can extend diagonally upward from the bottom, i.e., at an angle different from 90° with respect to the horizontal. In principle, any desired orientation of the receiving device 56 is possible.

As mentioned, the setting device 42 has an internal magazine 62 into which, as described above, the tolerance compensation elements 16 are inserted via the provision unit 40. As described, the magazine 62 has a shape, in particular a cross-sectional shape, which corresponds to the shape of the tolerance compensation elements 16, as described for FIG. 8. Shifting or tilting can hereby be avoided. The tolerance compensation elements 16 are also stacked in the correct position on top of one another and can optionally be separated from one another. The setting arrangement 36 is furthermore designed in such a way that it is possible to insert various quantities of tolerance compensation elements 16 into the magazine 62 of the setting device 42. If, for example, the magazine 62 is still partially filled with tolerance compensation elements 16, then only enough tolerance compensation elements 16 are pushed in via the provision unit 40 until the magazine 62 is completely filled. Furthermore, the setting device 42 is designed to be movable. In particular, at least the magazine 62 can be moved, for example via a robot arm 66. The setting device 42, more precisely the magazine 62, is flanged on, preferably via a mounting plate 78 on the robot or robot arm 66.

After the docking process, the setting device 42, in particular the magazine 62, which is mounted on the robot or robot arm 66, can move back into the starting position, that is to say the setting position. After parts, that is to say the tolerance compensation elements 16, have been picked up by the setting device 42, the provision unit 40 is refilled up to the maximum fill level. Meanwhile, the setting device 42 sets the tolerance compensation elements 16, that is to say, they are attached to the flanges 14*a*. This is also done in an automated manner, as will now be described with reference to FIG. 7.

Figure 7:
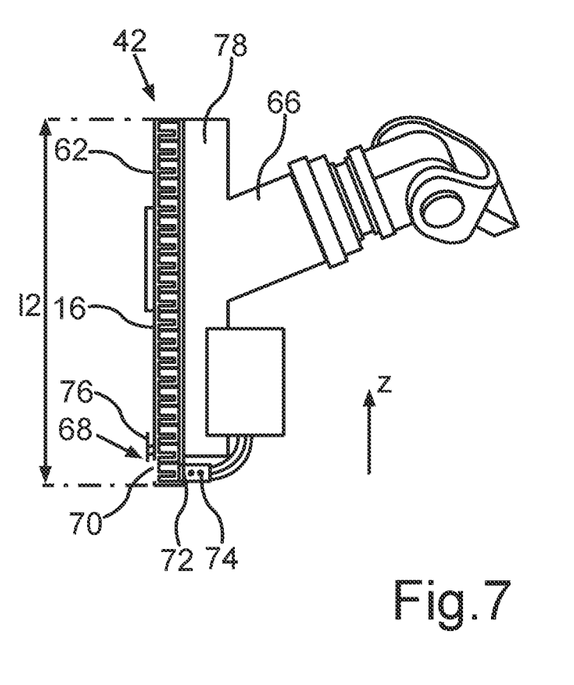
FIG. 7 shows a schematic illustration of a setting unit of a setting arrangement according to an exemplary embodiment of the invention.

FIG. 7 shows the setting device 42 once again. In this example, the magazine 62 is oriented vertically with its longitudinal extension 12, that is to say oriented in parallel to a direction of gravity. In the example shown, this direction extends opposite to the z direction. In an end region 68, the lower end region 68 shown here in FIG. 7, the magazine 62 has an outlet opening 70 and a coupling region for coupling to an outfeed mechanism, for example a cylinder 74. The outlet opening 70 is arranged opposite to the coupling region 72 in relation to a direction perpendicular to the longitudinal extension 12. The relevant tolerance compensation elements 16 can be pushed out having their connecting mechanism in front, for example having their gap 20 in front, towards the outlet opening 70. In this example, the pushing out is carried out by a cylinder 74, which can move into the magazine 62 and thereby push out the tolerance compensation element 16 lying opposite to the outlet opening 70. A cylinder 74 can therefore be used as a push-on mechanism. This pushes the tolerance compensation elements 16 onto the flanges 14*a* of the battery housing 14 in a precisely positioned manner. The outlet opening 70 is at least as large as the height of a tolerance compensation element 16, preferably slightly larger, but significantly smaller in relation to a direction along the longitudinal extension 12 than twice the height of a tolerance compensation element 16. This can ensure that always only a single tolerance compensation element 16 is pushed out of the outlet opening 70 by the cylinder 74. A loss protection unit 76, for example in the form of a closure 76, can also be provided for the outlet opening 70 as protection against movement or falling out. This is attached in the front region 68 of the setting device 42. This closes the duct, that is to say the opening 70, via which the tolerance compensation element 16 is pushed onto the flange 14*a*.

In this example, the push-out direction is perpendicular to the direction of the longitudinal extension 12. In principle, other push-out directions are also conceivable, for example in the longitudinal extension direction, depending on the connecting mechanism of the tolerance compensation elements. The robot arm 66 can therefore position the output opening 70 directly in front of a flange 14*a* of the battery housing 14 or, in general, the connecting mechanism of the tolerance compensation element 16 directly in front of a corresponding connecting counterpart of a component, and then correspondingly push out a tolerance compensation element 16, in particular the lowest one, which is arranged directly opposite to the outlet opening 70. Since this is correctly oriented, i.e., is pushed out having the gap 20 or the general connecting mechanism in front, this tolerance compensation element 16 can be pushed in the correct position onto the flange 14*a* or attached to the corresponding connecting counterpart of the component. Due to the force of gravity, the remaining tolerance compensation elements 16 then slide down, the setting device 42 can convey the magazine 62 to the next setting position and thus automatically set the next tolerance compensation element 16, and so on.

Overall, the examples show how the invention can provide a joining system for the automated setting of tolerance compensation elements. Thanks to the novel joining system, the tolerance compensation elements can be set automatically in battery assembly but also in other manufacturing areas. The great advantage here is that the tolerance compensation elements can be plugged on with repeated accuracy in order to be able to carry out further automated manufacturing or assembly steps in subsequent processes, for example to enable automated screwing on of battery modules having an integrated tolerance compensation element, using the battery as an example. In addition, fully automatic monitoring of the unscrewing behavior of the tolerance compensation elements is possible. The process can also be evaluated and assessed automatically by recording force-displacement curves.

The invention claimed is:

1. A setting arrangement for automatically attaching tolerance compensation elements to a respective component, comprising:
    a storage unit which is designed to receive the tolerance compensation elements and to position them correctly in a row in such a way that the tolerance compensation elements positioned in the row have the same orientation;
    a pushing cylinder, and
    a movable setting unit which has a magazine in which the tolerance compensation elements correctly positioned in a row are receivable, wherein the magazine has a first longitudinal extension in which the tolerance compensation elements received in the magazine are arranged adjacent to one another, wherein the magazine has an opening, and wherein the setting unit is designed to dispense the tolerance compensation elements individually through the opening;
    wherein the opening is located in an end region of the receiving region of the magazine with respect to the longitudinal extension, so that only one last tolerance compensation element in the row in which the tolerance compensation elements are arranged can be pushed out of the opening by the pushing cylinder, wherein the setting unit is designed in such a way that the magazine is aligned when the last tolerance compensation element is pushed out of the opening such that the last tolerance compensation element represents a lowest tolerance compensation element with respect to gravity.

2. The setting arrangement as claimed in claim 1, wherein the setting arrangement has a provision unit which is designed to receive the tolerance compensation elements correctly positioned in a row from the storage unit and to transfer them to the setting unit.

3. The setting arrangement as claimed in claim 2, wherein the provision unit has a receiving device having a receiving region which has a second longitudinal extension, wherein the receiving device is designed in such a way that the tolerance compensation elements positioned correctly in the row can be received successively in the receiving region along the second longitudinal extension of the receiving region, wherein the receiving device has an inlet opening at one end with respect to the second longitudinal extension and has an outlet opening at an opposite end with respect to the second longitudinal extension, wherein at least a certain part of the tolerance compensation elements received in the receiving region can be pushed out of the exit opening, by a first sliding device insertable into the inlet opening.

4. The setting arrangement as claimed in claim 3, wherein the storage unit for orienting the tolerance compensation elements has a vibrating bowl and/or step conveyor and comprises a provision channel in which the oriented tolerance compensation elements can be positioned correctly in a row.

5. The setting arrangement as claimed in claim 3, wherein the storage unit has a height monitoring device which is designed to check whether the tolerance compensation elements positioned correctly in the row each have a certain initial state in which the tolerance compensation elements, which are changeable in their height with respect to a defined axis of rotation of the tolerance compensation elements, have a minimum height with respect to the defined axis of rotation.

6. The setting arrangement as claimed in claim 3, wherein the magazine has a receiving region which is delimited perpendicular to the first longitudinal extension by a first wall of the magazine, wherein a second wall has a geometry different from a circular shape in a cross section perpendicular to the first longitudinal extension, so that tolerance compensation elements received in the magazine are substantially not rotatable around an axis of rotation which extends in the second longitudinal extension and is assigned to the tolerance compensation elements.

7. The setting arrangement as claimed in claim 2, wherein the storage unit for orienting the tolerance compensation elements has a vibrating bowl and/or step conveyor and comprises a provision channel in which the oriented tolerance compensation elements can be positioned correctly in a row.

8. The setting arrangement as claimed in claim 2, wherein the storage unit has a height monitoring device which is designed to check whether the tolerance compensation elements positioned correctly in the row each have a certain initial state in which the tolerance compensation elements, which are changeable in their height with respect to a defined axis of rotation of the tolerance compensation elements, have a minimum height with respect to the defined axis of rotation.

9. The setting arrangement as claimed in claim 2, wherein the magazine has a receiving region which is delimited perpendicular to the first longitudinal extension by a first wall of the magazine, wherein a second wall has a geometry different from a circular shape in a cross section perpendicular to the first longitudinal extension, so that tolerance compensation elements received in the magazine are substantially not rotatable around an axis of rotation which extends in the second longitudinal extension and is assigned to the tolerance compensation elements.

10. The setting arrangement as claimed in claim 1, wherein the storage unit for orienting the tolerance compensation elements has a vibrating bowl and/or step conveyor and comprises a provision channel in which the oriented tolerance compensation elements can be positioned correctly in a row.

11. The setting arrangement as claimed in claim 4, wherein the storage unit has a height monitoring device which is designed to check whether the tolerance compensation elements positioned correctly in the row each have a certain initial state in which the tolerance compensation elements, which are changeable in their height with respect to a defined axis of rotation of the tolerance compensation elements, have a minimum height with respect to the defined axis of rotation.

12. The setting arrangement as claimed in claim 10, wherein the magazine has a receiving region which is delimited perpendicular to the first longitudinal extension by a first wall of the magazine, wherein a second wall has a geometry different from a circular shape in a cross section perpendicular to the first longitudinal extension, so that tolerance compensation elements received in the magazine are substantially not rotatable around an axis of rotation which extends in the second longitudinal extension and is assigned to the tolerance compensation elements.

13. The setting arrangement as claimed in claim 1, wherein the storage unit has a height monitoring device which is designed to check whether the tolerance compensation elements positioned correctly in the row each have a certain initial state in which the tolerance compensation elements, which are changeable in their height with respect to a defined axis of rotation of the tolerance compensation elements, have a minimum height with respect to the defined axis of rotation.

14. The setting arrangement as claimed in claim 13, wherein the magazine has a receiving region which is delimited perpendicular to the first longitudinal extension by a first wall of the magazine, wherein a second wal has a geometry different from a circular shape in a cross section perpendicular to the first longitudinal extension, so that tolerance compensation elements received in the magazine are substantially not rotatable around an axis of rotation which extends in the second longitudinal extension and is assigned to the tolerance compensation elements.

15. The setting arrangement as claimed in claim 1, wherein the magazine has a receiving region which is delimited perpendicular to the first longitudinal extension by a first wall of the magazine, wherein a second wall has a geometry different from a circular shape in a cross section perpendicular to the first longitudinal extension, so that tolerance compensation elements received in the magazine are substantially not rotatable around an axis of rotation which extends in the second longitudinal extension and is assigned to the tolerance compensation elements.

16. The setting arrangement as claimed in claim 1, wherein the magazine has a closure element, by which the opening of the magazine is at least partially closable, wherein the setting unit is designed such that the magazine is movable between a filling position and at least one setting position, wherein the setting unit is designed such that the opening is closable, at least during the movement of the magazine between the filling position and the at least one setting position and also during filling, by the closure element.

17. The setting arrangement as claimed in claim 1, wherein the setting unit has a second sliding device having a movable element, by which a tolerance compensation element positioned in the sliding direction in front of the opening can be pushed out of the opening, perpendicular to the first longitudinal extension.

* * * * *